United States Patent
Sloan

(10) Patent No.: US 11,713,545 B2
(45) Date of Patent: Aug. 1, 2023

(54) ROPES WITH ENHANCED CBOS FATIGUE LIFE

(71) Applicant: KURARAY CO., LTD., Kurashiki (JP)

(72) Inventor: Forrest Sloan, Houston, TX (US)

(73) Assignee: KURARAY CO., LTD., Kurashiki-shi (JP)

( * ) Notice: Subject to any disclaimer, the term of this patent is extended or adjusted under 35 U.S.C. 154(b) by 90 days.

(21) Appl. No.: 17/382,402

(22) Filed: Jul. 22, 2021

(65) Prior Publication Data
US 2022/0025577 A1 Jan. 27, 2022

Related U.S. Application Data

(60) Provisional application No. 63/055,981, filed on Jul. 24, 2020.

(51) Int. Cl.
*D07B 1/02* (2006.01)
*C08G 63/06* (2006.01)
*C08G 69/12* (2006.01)
*G01N 3/34* (2006.01)

(52) U.S. Cl.
CPC ............ *D07B 1/025* (2013.01); *C08G 63/065* (2013.01); *C08G 69/12* (2013.01); *C08G 2250/00* (2013.01); *D07B 2201/1096* (2013.01); *D07B 2501/2015* (2013.01); *G01N 3/34* (2013.01)

(58) Field of Classification Search
CPC ............ D07B 1/025; D07B 2201/1096; B07B 2201/1096
See application file for complete search history.

(56) References Cited

U.S. PATENT DOCUMENTS

| | | | | |
|---|---|---|---|---|
| 4,257,309 A | * | 3/1981 | Dunahoo | D07B 1/18 57/22 |
| 6,945,153 B2 | | 9/2005 | Knudsen et al. | |
| 7,568,419 B2 | | 8/2009 | Bosman | |
| 7,789,007 B2 | | 9/2010 | Bosman | |
| 8,109,072 B2 | * | 2/2012 | Chou | D07B 5/06 57/237 |
| 8,881,496 B2 | | 11/2014 | Bosman et al. | |
| 11,229,432 B2 | * | 1/2022 | Coffey | D04C 1/12 |

(Continued)

FOREIGN PATENT DOCUMENTS

| | | |
|---|---|---|
| EP | 2462275 B1 | 6/2016 |
| EP | 1893798 B1 | 10/2017 |

(Continued)

OTHER PUBLICATIONS

International Search Report and Written Opinion dated Dec. 1, 2021 in PCT/US2021/042458, 10 pages.

*Primary Examiner* — Shaun R Hurley
(74) *Attorney, Agent, or Firm* — Element IP, PLC

(57) ABSTRACT

Disclosed herein are ropes containing bundles of filaments, where each bundle includes at least 70% by volume of liquid crystal polymer filaments, and where at least one bundle includes liquid crystal polymer filaments of at least 10 denier per filament in size. Also disclosed herein are methods of pulling or lifting an object by applying tension to such a rope connected to the object, where the rope is arranged over a sheave or a non-rotating guide surface, and a ratio of a diameter of the sheave or an effective diameter of the non-rotating guide surface, D, to a diameter of the rope, d, is at least 20:1.

20 Claims, 3 Drawing Sheets

(56) References Cited

U.S. PATENT DOCUMENTS

| | | | |
|---|---|---|---|
| 2004/0069132 A1 | 4/2004 | Knudsen et al. | |
| 2004/0094023 A1* | 5/2004 | Niwa | D07B 1/025 87/9 |
| 2006/0207414 A1 | 9/2006 | Nye | |
| 2014/0295184 A1* | 10/2014 | Grabandt | D07B 1/167 428/371 |
| 2018/0087188 A1 | 3/2018 | De Jong et al. | |
| 2019/0223868 A1* | 7/2019 | Coffey | D07B 1/025 |
| 2020/0141054 A1* | 5/2020 | Hermes | D02G 3/02 |

FOREIGN PATENT DOCUMENTS

| | | | |
|---|---|---|---|
| JP | 4820869 | 11/2011 | |
| JP | 2016191179 A | 11/2016 | |
| WO | WO-2017178484 A1 * | 10/2017 | B66C 13/00 |

* cited by examiner

ROPES WITH ENHANCED CBOS FATIGUE LIFE

TECHNICAL FIELD

This application relates to materials technology in general and more specifically to ropes having improved performance in cyclic bend-over-sheave (CBOS) applications. More particularly, this application discloses ropes comprising bundles of liquid crystal polymer filaments. Ropes disclosed herein are useful, for example, in applications where a tensioned rope repeatedly passes over a sheave or a non-rotating guide surface.

BACKGROUND OF THE INVENTION

Humans have made and used rope for pulling, carrying and lifting for thousands of years. Typically, a rope is a group of fibers, yarns or strands that are twisted or braided together into a larger and stronger form. For example, a rope may be constructed by combining individual filaments into fibers, twisting the fibers to form a twisted yarn, braiding the twisted yarn to form a braided strand, and then braiding the braided strand to form a braided rope.

The type of damage that leads to failure in ropes depends on several factors, including the operating conditions, the construction of the rope, and perhaps most importantly the type of fibers used to manufacture the rope. When large diameter ropes are pulled over a sheave (e.g., a pulley) or a non-rotating guide surface, two damage mechanisms are generally observed.

The first damage mechanism is frictional heat generated within the rope. This heat may be caused by the individual elements of the rope abrading one another (such as at crossover points of a braided construction), or by the rope rubbing against the sheave or non-rotating guide surface. This generated heat can be sufficient to cause a catastrophic failure of the rope. This problem is particularly evident when the fiber material loses a substantial amount of strength (or becomes susceptible to creep elongation or creep rupture) when heated sufficiently above ambient temperature. For example, high modulus polyethylene (HMPE) fibers exhibit this type of failure.

The second damage mechanism observed during over-sheave cycling of ropes is self-abrasion or fiber-to-fiber abrasion (i.e., rope fibers rubbing against one another). HMPE fibers generally exhibit a low amount of fiber-to-fiber abrasion. Instead, this type of damage is most often observed in ropes made from lyotropic liquid crystal polymer (LCP) fibers. For example, aramids are known to be a poor material for general rope use because of self-abrasion; aramid fibers, however, are not generally susceptible to heat-induced creep effects.

There is a need for improvements in rope performance to reduce the occurrence of these two damage mechanisms. In particular, there is a need to reduce the occurrence of these damage mechanisms in rope used in cyclic bend-over-sheave applications.

SUMMARY OF THE DISCLOSURE

The present inventor has recognized that a need exists to develop rope having improved performance in cyclic bend-over-sheave (CBOS) applications. In particular, a need exists to develop new designs for ropes that will be produced in relatively large diameters, because large diameter ropes are more susceptible to the damage modes described above.

The following disclosure describes the preparation and utility of rope having improved performance in CBOS applications.

Embodiments of the present disclosure, described herein such that one of ordinary skill in this art can make and use them, include the following:

(1) One aspect relates to ropes comprising bundles of filaments, wherein each bundle comprises at least 70% by volume of liquid crystal polymer filaments, and wherein at least one bundle comprises liquid crystal polymer filaments of at least 10 denier per filament in size.

(2) Another aspect relates to methods of pulling or lifting an object by applying tension to such a rope connected to the object, where the rope is arranged over a sheave or a non-rotating guide surface, and a ratio of a diameter of the sheave or an effective diameter of the non-rotating guide surface, D, to a diameter of the rope, d, is at least 20:1.

Additional objects, advantages and other features of the present disclosure will be set forth in part in the description that follows and in part will become apparent to those having ordinary skill in the art upon examination of the following or may be learned from the practice of the present disclosure. The present disclosure encompasses other and different embodiments from those specifically described below, and the details herein are capable of modifications in various respects without departing from the present disclosure. In this regard, the description herein is to be understood as illustrative in nature, and not as restrictive.

BRIEF DESCRIPTION OF THE DRAWINGS

Embodiments of this disclosure are explained in the following description in view of the figures.

DETAILED DESCRIPTION

Figure 1:
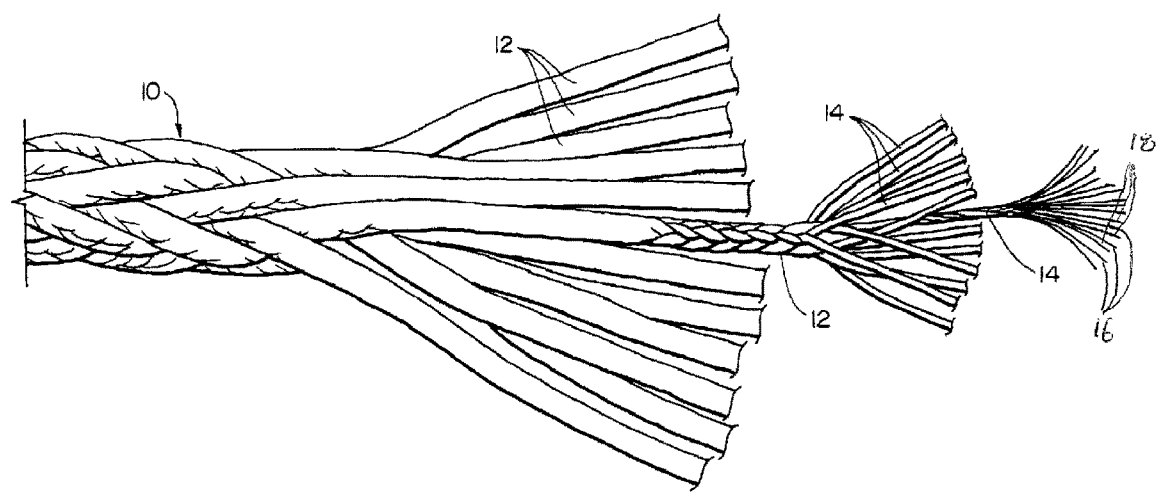
FIG. 1 is a schematic illustration of an exemplary embodiment of a rope. In this rope construction, individual filaments are combined into fibers, the fibers are twisted to form a twisted yarn, plural twisted yarns are braided to form a braided strand, and then plural braided strands are braided to form a braided rope.

Embodiments of this disclosure include various ropes, as well as methods of using the ropes.

Unless otherwise defined, all technical and scientific terms used herein have the same meaning as commonly understood by persons of ordinary skill in the relevant art. In case of conflict, the present specification, including definitions, will control.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure is to be limited to the specific values recited when defining a range.

The use of "a" or "an" to describe the various elements and components herein is merely for convenience and to give a general sense of the disclosure. This description should be read to include one or at least one and the singular also includes the plural unless it is clear that it is otherwise intended.

Unless expressly stated to the contrary, "or" and "and/or" refers to an inclusive and not to an exclusive. For example, a condition "A or B", or "A and/or B", is satisfied by any one of the following: A is true (or present) and B is false (or not present), A is false (or not present) and B is true (or present), and both A and B are true (or present).

The terms "about" and "approximately" as used herein refer to being nearly the same as a referenced amount or value, and should be understood to encompass ±5% of the specified amount or value.

The term "substantially" as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

Throughout the present description, unless otherwise defined and described, technical terms and methods employed to determine associated measurement values are in accordance with the description of ASTM D855/D885M-10A (2014), Standard Test Methods for Tire Cords, Tire Cord Fabrics, and Industrial Filament Yarns Made From Man-made Organic-base Fibers, published October 2014.

For convenience, many elements of the various embodiments disclosed herein are discussed separately. Although lists of options may be provided and numerical values may be in ranges, the present disclosure should not be considered as being limited to the separately described lists and ranges. Unless stated otherwise, each and every combination possible within the present disclosure should be considered as explicitly disclosed for all purposes.

The materials, methods, and examples herein are illustrative only and, except as specifically stated, are not intended to be limiting. Methods and materials similar or equivalent to those described herein may also be used in the practice or testing of the present disclosure.

Rope

Embodiments described herein include ropes comprising bundles of filaments, including liquid crystal polymer (LCP) filaments, where the ropes have improved performance in cyclic bend-over-sheave (CBOS) applications, such as when the ropes are arranged over pulleys. The improvement in performance typically is an increased number of cycles to failure, compared to conventional ropes.

As used herein, a "rope" is a group of fibers, yarns or strands that are twisted or braided together into a larger and stronger form. For example, a rope may be constructed by combining individual filaments into fibers, twisting the fibers to form a twisted yarn, braiding the twisted yarn to form a braided strand, and then braiding the braided strand to form a braided rope.

FIG. 1 illustrates an exemplary embodiment of such a rope. In FIG. 1, fibers 16 and 18 are composed of filaments. Fibers 16 and 18 are twisted to form twisted yarn 14. Plural twisted yarns 14 are braided to form braided strand 12. Finally, plural braided strands 12 are braided to form braided rope 10.

As mentioned above, the term "rope" is used in the present application to denote a group of fibers, yarns or strands that are twisted or braided together into a larger and stronger form. Thus, in the present application, a "rope" may be, for example, a group of fibers 16 and/or fibers 18 twisted or braided together as shown in FIG. 1. Similarly, in the present application, a "rope" may be a group of yarns 14 twisted or braided together as shown in FIG. 1. Similarly, in the present application, a "rope" may be a group of strands 12 twisted or braided together as shown in FIG. 1. When the rope is formed by twisting sub-rope elements together, as opposed to braiding them, the rope is also known as a twisted, stranded, or wire-lay rope.

In FIG. 1, the fibers 16 and 18 are composed of filaments. The fibers 16 and 18 each may be composed of a plurality of filaments (i.e., a multifilament fiber). Alternatively, the fibers 16 and/or 18 each may be composed of a single filament (i.e., a monofilament fiber). Fiber 16 may be different in kind from fiber 18, for example in terms of the chemical composition of the filament(s) in the fiber, in terms of the number of filament(s) in the fiber, in terms of the size of the filament(s) in the fiber, or in terms of some other material property of the fiber. In certain embodiments, only one type of fiber is used; i.e., fiber 16 may be present while fiber 18 is absent.

In certain embodiments, the present application relates to a rope comprising bundles of filaments. Here "bundle of filaments" means a plurality of filaments gathered together. In an embodiment where fiber 16 and/or fiber 18 is composed of a plurality of filaments (i.e., a multifilament fiber), then fiber 16 and/or fiber 18 could be considered to be a bundle of filaments. Alternatively, in an embodiment where fiber 16 and/or fiber 18 is composed of a single filament (i.e., a monofilament fiber), then fiber 16 and/or fiber 18 would not be a bundle of filaments; in this case, the smallest bundle of filaments would be a plurality of monofilament fibers 16 and/or 18.

Of course, in certain embodiments, the higher-level structures in FIG. 1 also can be considered to be bundles of filaments. For example, in some embodiments the yarn 14 ormed from the fibers 16 and 18 can be considered to be a bundle of filaments. Similarly, in some embodiments the strand 12 formed from the yarn 14 can be considered to be a bundle of filaments.

The chemical composition of the filaments in the present application is such that each bundle of filaments comprises at least 70% by volume of liquid crystal polymer (LCP) filaments. In preferred embodiments, each bundle of filaments comprises at least 75%, at least 80%, at least 85%, at least 90%, at least 95%, at least 96%, at least 97%, at least 98%, or at least 99% by volume of LCP filaments. In a particularly preferred embodiment, each bundle of filaments consists of LCP filaments, i.e., each bundle of filaments comprises 100% by volume of LCP filaments.

LCP filaments include lyotropic polymer filaments and thermotropic polymer filaments. Lyotropic polymers decompose before melting but form liquid crystals in solution under appropriate conditions (these polymers typically are solution spun). Lyotropic polymer filaments include, for example, aramid and poly(p-phenylene benzobisoxazole) (PBO) filaments, as well as copolymer aramid filaments. Aramid filaments are commercially available under the tradename KEVLAR® from DuPont, and TWARON® and TECHNORA® from Teijin Ltd. PBO fibers are commercially available under the tradename ZYLON® from Toyobo Company Ltd. Thermotropic polymers exhibit liquid crystal formation in melt form. Thermotropic filaments include, for example, an aromatic polyester formed by the polycondensation of 4-hydroxybenzoic acid and 6-hydroxynaphthalene-2-carboxylic acid, commercially available under the tradename VECTRAN® from KURARAY CO., LTD. In some embodiments, a single kind of LCP filament is used in each bundle of the rope. In other embodiments, two or more kinds of LCP filaments are used in some or in all of the bundles of the rope.

In certain embodiments of the present application, the rope includes bundles comprising filaments that are not LCP filaments, in addition to the LCP filaments. In such embodiments, each bundle of filaments in the rope comprises at most 30% by volume of non-LCP filaments. In preferred embodiments, each bundle of filaments comprises at most 25%, at most 20%, at most 15%, at most 10%, at most 5%, at most 4%, at most 3%, at most 2%, or at most 1% by volume of non-LCP filaments. As mentioned above, in a particularly preferred embodiment, each bundle of filaments consists of LCP filaments, i.e., in this embodiment, each bundle of filaments comprises 0% by volume of non-LCP filaments.

Non-LCP filaments include, but are not limited to, polyether ether ketone filaments, ultra-high molecular weight polyethylene filaments, high modulus polyethylene (HMPE) filaments, polypropylene filaments, polyethylene terephthalate filaments, polyimide filaments, high-strength polyvinyl alcohol filaments, polyhydroquinone diimidazopyridine (PIPD) filaments, and combinations thereof, just to name a few. In some embodiments, a single kind of non-LCP filament is used in one or more bundles of the rope. In other embodiments, two or more kinds of non-LCP filaments are used in some or in all of the bundles of the rope. In yet other embodiments, a specific kind of non-LCP filament is excluded from the rope. For example, each bundle of filaments in the rope may comprise no HMPE filaments.

Polymerized units of the LCP and non-LCP filaments may include those shown in Table 1.

TABLE 1

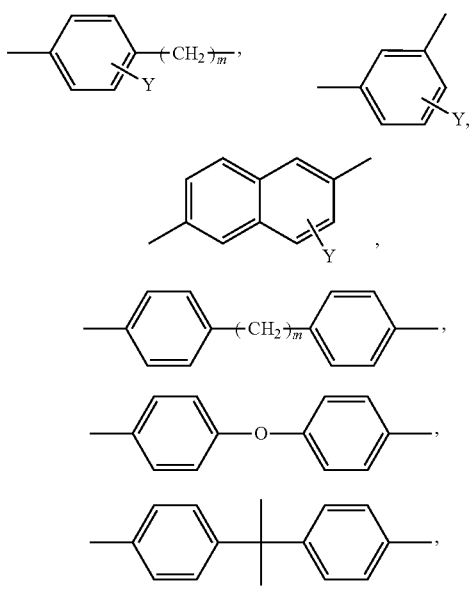

(in which X in the formulas is selected from the following structures)

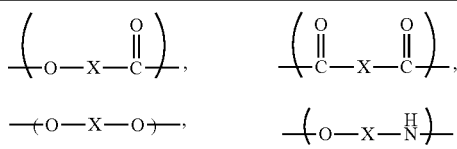

TABLE 1-continued

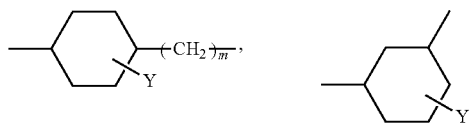

(in which m = 0 to 2, and Y = a substituent selected from a hydrogen atom, a halogen atom, an alkyl group, an aryl group, an aralkyl goup, an alkoxy group, an aryloxy group, and an aralkyloxy group)

Regarding the polymerized units illustrated in Table 1 above, the number of Y substituent groups is equal to the maximum number of substitutable positions in the ring structure, and each Y independently represents a hydrogen atom, a halogen atom (for example, a fluorine atom, a chlorine atom, a bromine atom, an iodine atom, etc.), an alkyl group (for example, an alkyl group having 1 to 4 carbon atoms such as a methyl group, an ethyl group, an isopropyl group, or a t-butyl group), an alkoxy group (for example, a methoxy group, an ethoxy group, an isopropoxy group, an n-butoxy group, etc.), an aryl group (for example, a phenyl group, a naphthyl group, etc.), an aralkyl group [a benzyl group (a phenylmethyl group), a phenethyl group (a phenylethyl group), etc.], an aryloxy group (for example, a phenoxy group, etc.), an aralkyloxy group (for example, a benzyloxy group, etc.), or mixtures thereof.

LCP filaments may be obtained by melt spinning of a liquid crystalline polyester resin. The spun filaments may be further heat treated to enhance mechanical properties. The liquid crystalline polyester may be composed of a repeating polymerized unit, for example, derived from an aromatic diol, an aromatic dicarboxylic acid, or an aromatic hydroxycarboxylic acid. The liquid crystalline polyester may optionally further comprise a polymerized unit derived from an aromatic diamine, an aromatic hydroxyamine, and/or an aromatic aminocarboxylic acid.

More specific polymerized units are illustrated in the following structures shown in Tables 2 to 4 below.

When the polymerized unit in the formulas is a unit which can represent plural structures, two or more units may be used in combination as polymerized units constituting a polymer.

In the polymerized units of Tables 2, 3, and 4, n is an integer of 1 or 2, and the respective units n=1, n=2 may exist alone or in combination; and $Y_1$ and $Y_2$ each independently may be a hydrogen atom, a halogen atom (for example, a fluorine atom, a chlorine atom, a bromine atom, an iodine atom, etc.), an alkyl group (for example, an alkyl group having 1 to 4 carbon atoms such as a methyl group, an ethyl group, an isopropyl group, or a t-butyl group), an alkoxy group (for example, a methoxy group, an ethoxy group, an isopropoxy group, an n-butoxy group, etc.), an aryl group (for example, a phenyl group, a naphthyl group, etc.), an aralkyl group (a benzyl group (a phenylmethyl group), a phenethyl group (a phenylethyl group), etc.), an aryloxy group (for example, a phenoxy group, etc.), an aralkyloxy group (for example, a benzyloxy group, etc.), or mixtures thereof. Among these groups, Y is preferably a hydrogen atom, a chlorine atom, a bromine atom, or a methyl group.

TABLE 2

(1)

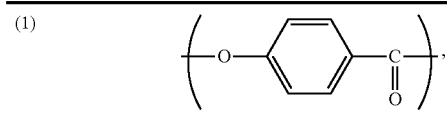

TABLE 2-continued
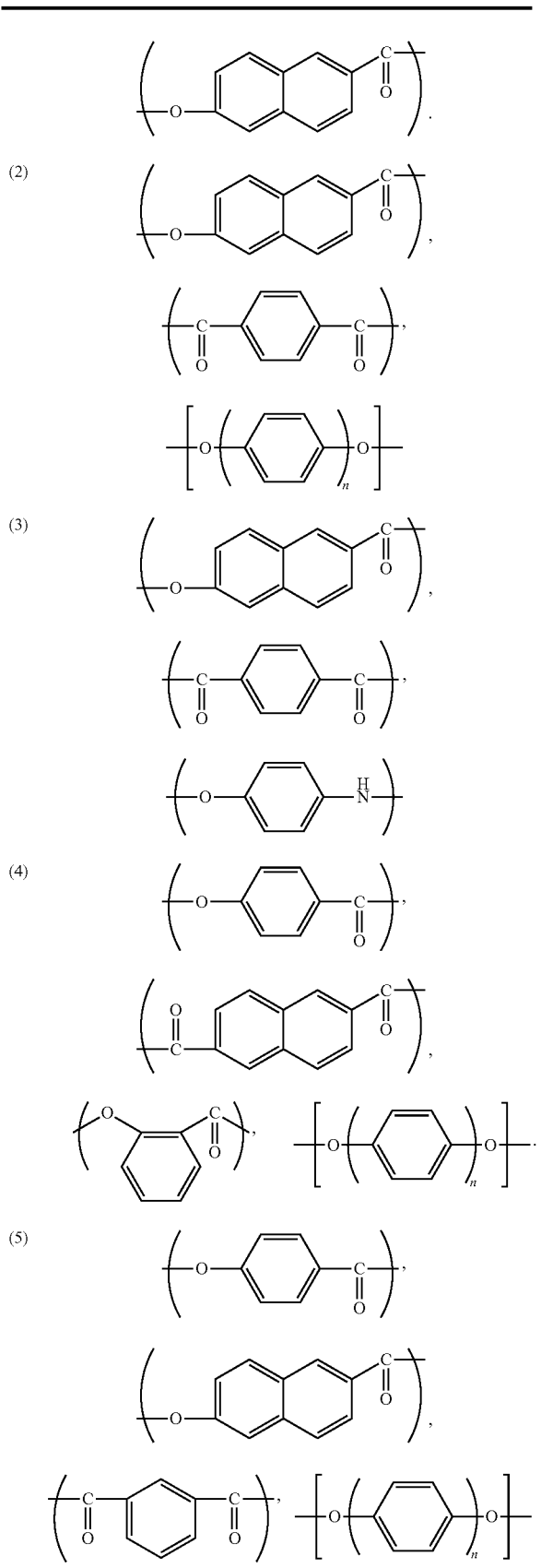
TABLE 2-continued
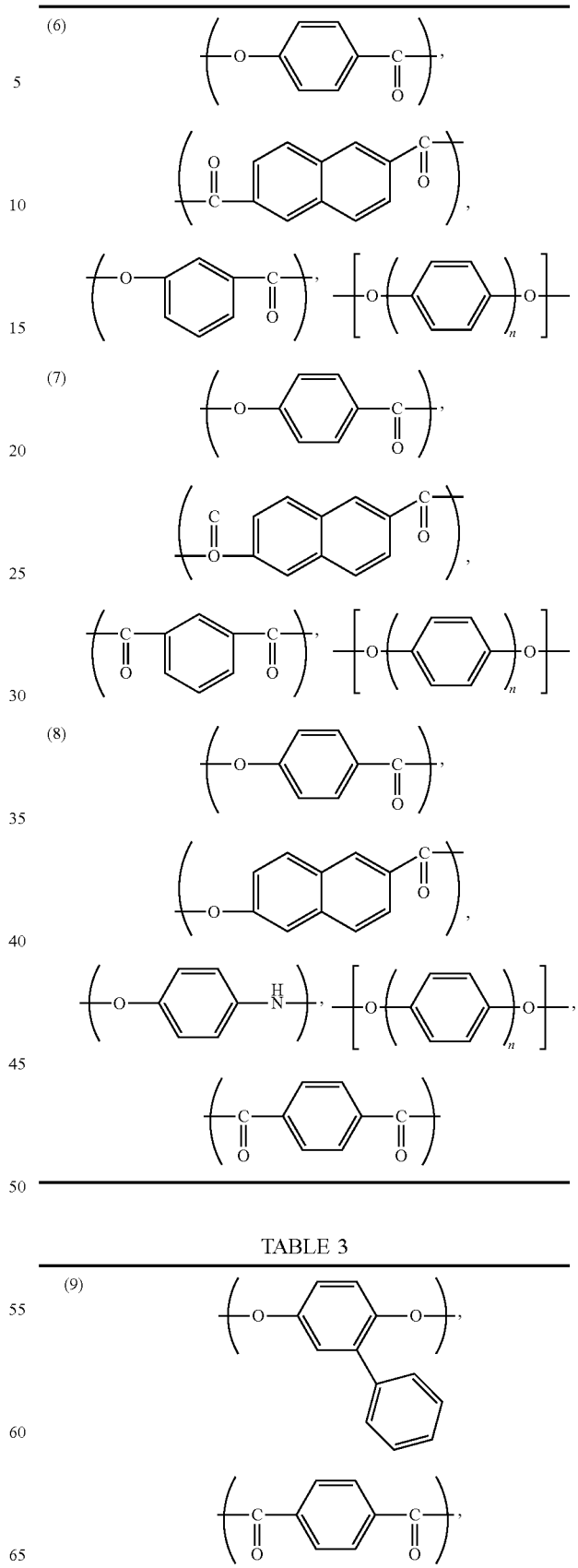
TABLE 3

TABLE 3-continued
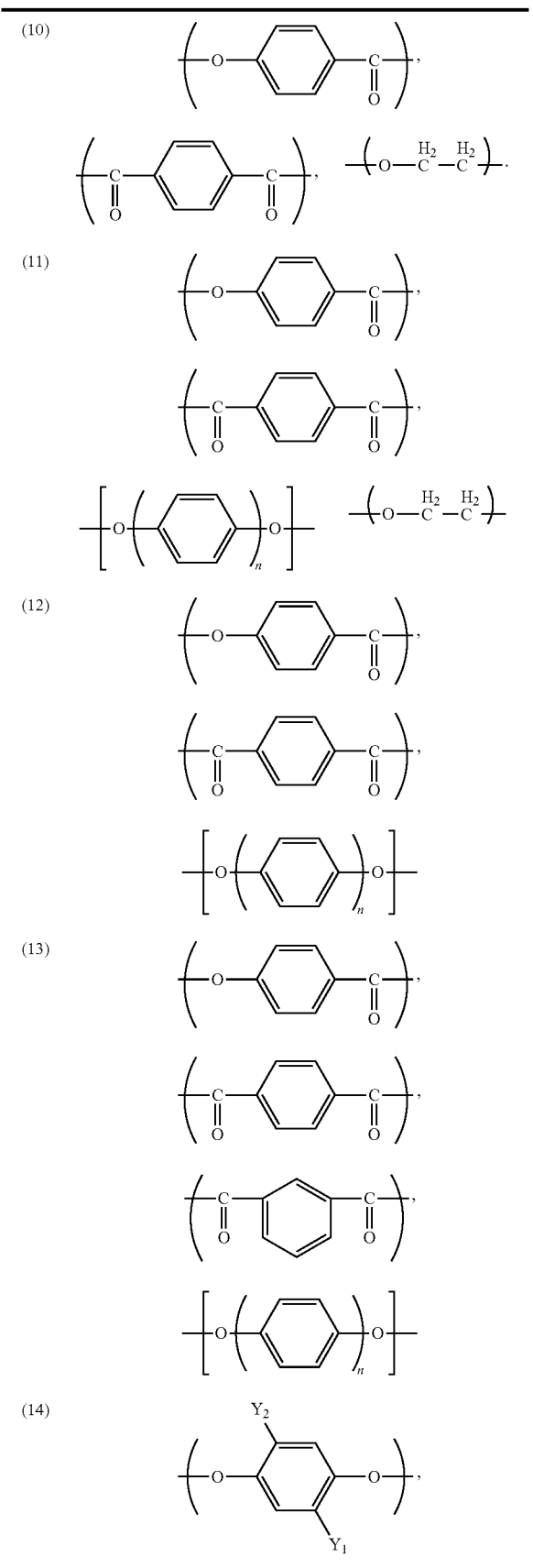
TABLE 3-continued
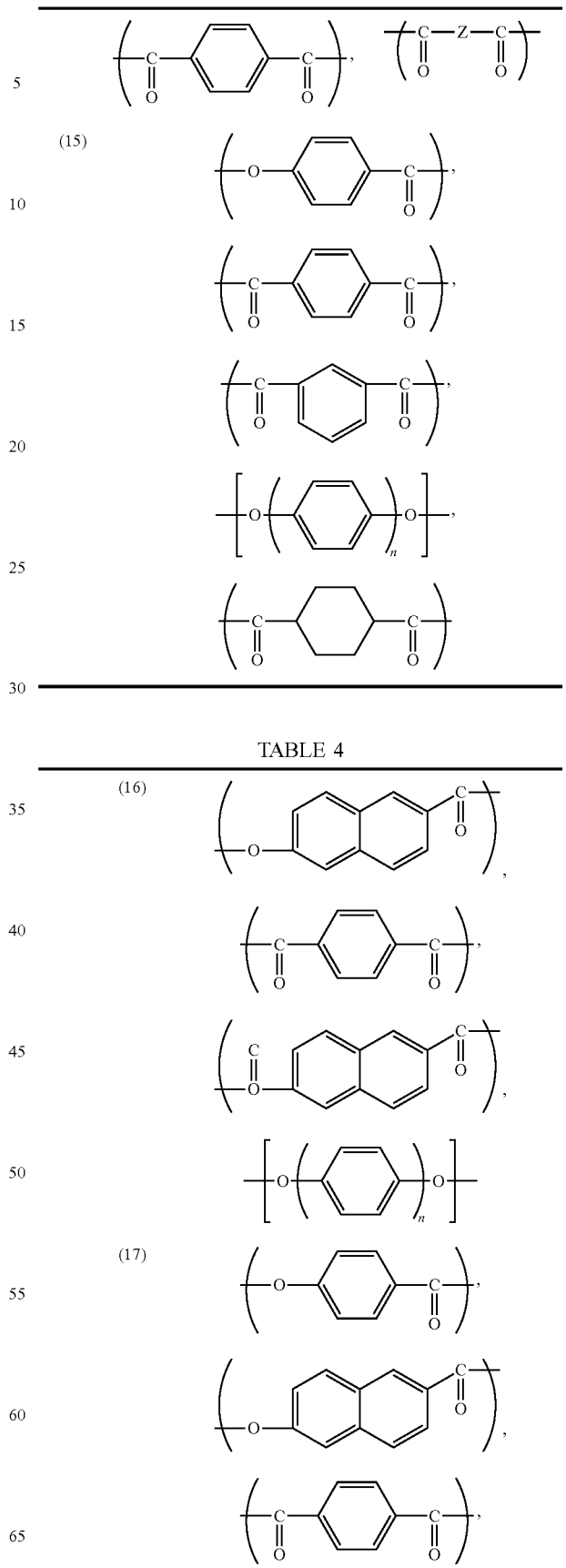
TABLE 4

TABLE 4-continued

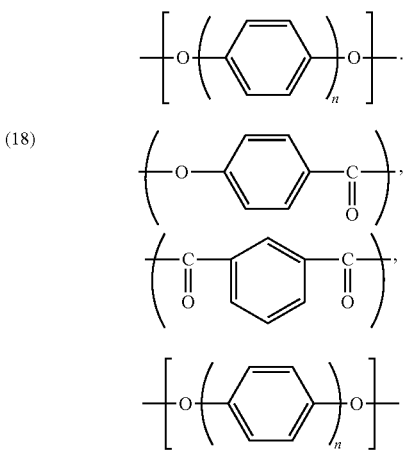

Z in (14) of Table 3 may comprise divalent groups represented by the formulae below:

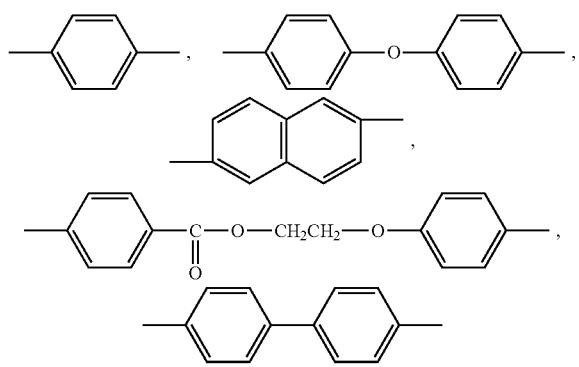

In some embodiments a liquid crystalline polyester may be a combination comprising a naphthalene skeleton as a polymerized unit. Particularly, it may include both a polymerized unit (A) derived from 4-hydroxybenzoic acid and a polymerized unit (B) derived from 6-hydroxynaphthalene-2-carboxylic acid. For example, the unit (A) may be of formula (A) and the unit (B) may be of formula (B). From the viewpoint of improving melt moldability, a ratio of the units (A) to the units (B) may be in a range of from 9/1 to 1/1, preferably 7/1 to 1/1, and more preferably 5/1 to 1/1.

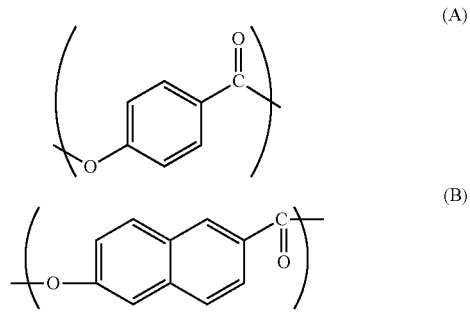

The total of the polymerized units (A) and the polymerized units (B) may be, for example, about 65 mol % or more, or about 70 mol % or more, or about 80 mol % or more, based on the total polymerized units. In some embodiments the filaments may include a liquid crystalline polyester comprising about 4 to about 45 mol % of the polymerized unit (B) in the polymer.

Commercially available LCP filaments of the present disclosure may include VECTRAN® HT BLACK manufactured by KURARAY CO., LTD., VECTRAN® HT manufactured by KURARAY CO., LTD., SIVERAS® manufactured by Toray Industries, Inc., monofilament manufactured by ZEUS and ZXION® manufactured by KB SEIREN, LTD.

According to the present disclosure, "aramid filament" means a polyamide filament with high heat resistance and high strength comprising a molecular skeleton composed of an aromatic (benzene) ring. Aramid filaments may be classified into a para-aramid filament and a meta-aramid filament according to a chemical structure thereof.

Examples of commercially available aramid and copolymer aramid filaments include para-aramid filaments, for example, KEVLAR® manufactured by DuPont, HERACRON® from Kolon Industries Inc. and TWARON® and TECHNORA® manufactured by Teijin Ltd.; and meta-aramid filaments, for example, NOMEX® manufactured by DuPont and CONEX® manufactured by Teijin Ltd.

In some embodiments, the LCP filaments may include one or more copolymer aramid filaments. For example, in some embodiments, the LCP filaments comprise a copolyparaphenylene/3,4'-oxydiphenylene terephthalamide filament. This material is conventionally referred to as TECHNORA® and is available from Teijin.

Polyparaphenylenebenzobisoxazole (poly(p-phenylene-2,6-benzobisoxazole) (PBO) filaments are commercially available as ZYLON® AS and ZYLON® HM manufactured by Toyobo Co., Ltd.

Commercially available non-LCP filaments include polyether ether ketone (PEEK) materials such as VICTREX™ PEEK polymers.

Other non-LCP filaments include ultra-high molecular weight polyethylene filaments. These may have an intrinsic viscosity in a range of from about 5.0, or from about 7.0, or from about 10, to about 30, or to about 28, or to about 24 dL/g.

ASTM standards (for example Test Methods D789, D1243, D1601, and D4603, and Practice D3591) that describe dilute solution viscosity procedures for specific polymers, such as nylon, poly(vinyl chloride), polyethylene, and poly(ethylene terephthalate) are available. Generally, the polymer is dissolved in dilute solution and a drop time through a capillary tube versus a control sample is measured at a specific temperature.

A weight average molecular weight of the ultra-high molecular weight polyethylene filament may be from about 700,000, or from about 800,000, or from about 900,000, to about 8,000,000, or to about 7,000,000, or to about 6,000,000.

Due to difficulties in determining the weight average molecular weight of ultra-high molecular weight polyethylene filaments using GPC methods, it is possible to determine the weight average molecular weight based on a value of the above mentioned intrinsic viscosity according to the equation below mentioned in "Polymer Handbook Fourth Edition, Chapter 4 (John Wiley, published 1999)".

Weight average molecular weight=$5.365 \times 10^4 \times$(intrinsic viscosity)$^{1.37}$ In some embodiments it may be preferable for the repeating units of the ultra-high molecular weight polyethylene filament to contain substantially ethylene. However, it may be possible to use, in addition to a homopolymer of ethylene, a copolymer of ethylene with a small amount of another monomer, for example, α-olefin, acrylic acid and derivatives thereof, methacrylic acid and derivatives thereof, and vinylsilane and derivatives thereof. The polyethylene filament may have a partial crosslinked structure. The polyethylene filament may also be a blend of a high-density polyethylene with an ultra-high molecular weight polyethylene, a blend of a low-density polyethylene with an ultra-high molecular weight polyethylene, or a blend of a high-density polyethylene, a low-density polyethylene with an ultra-high molecular weight polyethylene. The polyethylene filament may be a combination of two or more ultra-high molecular weight polyethylenes having different weight average molecular weights, or two or more polyethylenes having different molecular weight distributions.

Commercially available ultra-high molecular weight polyethylene filaments include DYNEEMA® SK60, DYNEEMA® SK, IZANAS® SK60 and IZANAS® SK71 manufactured by Toyobo Co., Ltd., and SPECTRA FIBER 900® and SPECTRA FIBER 1000® manufactured by Honeywell, Ltd.

These ultra-high molecular weight polyethylene filaments can be used alone or in combination.

In some embodiments, the LCP filaments in the rope have a size of at least 2.5 denier per filament (dpf), at least 5 dpf, at least 10 dpf, at least 15 dpf, at least 20 dpf, at least 25 dpf, at least 30 dpf, at least 35 dpf, or at least 40 dpf. In some embodiments, the LCP filaments in the rope have a size of at most 100 dpf, at most 90 dpf, at most 80 dpf, at most 70 dpf, at most 60 dpf, at most 50 dpf, at most 40 dpf, at most 35 dpf, at most 30 dpf, at most 25 dpf, at most 20 dpf, at most 15 dpf, or at most 10 dpf.

Preferably, when the LCP filaments are present in a multifilament fiber, the LCP filaments have a size of at least 2.5 dpf. Alternatively, when the LCP filaments are present in monofilament fibers, the LCP filaments preferably have a size of at least 10 dpf.

In some embodiments, each bundle of filaments in the rope comprises at least 15 LCP filaments, at least 25 LCP filaments, at least 50 LCP filaments, at least 100 LCP filaments, at least 200 LCP filaments, at least 500 LCP filaments, at least 1000 LCP filaments, or at least 2000 LCP filaments. In some embodiments, each bundle of filaments in the rope comprises at most 5000 LCP filaments, at most 2000 LCP filaments, at most 1000 LCP filaments, at most 500 LCP filaments, at most 200 LCP filaments, at most 100 LCP filaments, at most 50 LCP filaments, or at most 25 LCP filaments.

As mentioned above, in the present application "bundle of filaments" means a plurality of filaments gathered together. In an embodiment where fiber 16 and/or fiber 18 in FIG. 1 is composed of a plurality of filaments (i.e., a multifilament fiber), then fiber 16 and/or fiber 18 could be considered to be a bundle of filaments. Alternatively, in an embodiment where fiber 16 and/or fiber 18 is composed of a single filament (i.e., a monofilament fiber), then fiber 16 and/or fiber 18 would not be a bundle of filaments; in this case, the smallest bundle of filaments would be a plurality of monofilament fibers 16 and/or 18.

Also as mentioned above, in certain embodiments of the present application, the higher-level structures in FIG. 1 also can be considered to be bundles of filaments. For example, in some embodiments the yarn 14 formed from the fibers 16 and 18 can be considered to be a bundle of filaments. Similarly, in some embodiments the strand 12 formed from the yarn 14 can be considered to be a bundle of filaments.

At least one bundle of filaments in the rope comprises LCP filaments of at least 10 dpf in size. In some embodiments, at least one bundle of filaments in the rope comprises LCP filaments of at least 15 dpf, at least 20 dpf, at least 25 dpf, at least 28 dpf, at least 29 dpf, at least 30 dpf, at least 35 dpf, or at least 40 dpf in size. In some embodiments, at least one bundle of filaments in the rope comprises LCP filaments of at most 100 dpf, at most 90 dpf, at most 80 dpf, at most 70 dpf, at most 60 dpf, at most 50 dpf, at most 40 dpf, at most 35 dpf, at most 30 dpf, at most 25 dpf, at most 20 dpf, or at most 15 dpf in size.

In some embodiments, each bundle of filaments in the rope comprises LCP filaments of at least 10 dpf in size. In some embodiments, each bundle of filaments in the rope comprises LCP filaments of at least 15 dpf, at least 20 dpf, at least 25 dpf, at least 28 dpf, at least 29 dpf, at least 30 dpf, at least 35 dpf, or at least 40 dpf in size. In some embodiments, each bundle of filaments in the rope comprises LCP filaments of at most 100 dpf, at most 90 dpf, at most 80 dpf, at most 70 dpf, at most 60 dpf, at most 50 dpf, at most 40 dpf, at most 35 dpf, at most 30 dpf, at most 25 dpf, at most 20 dpf, or at most 15 dpf in size.

In some embodiments, the rope has a cross-sectional diameter of at least 6 mm, at least 7 mm, at least 8 mm, at least 9 mm, at least 10 mm, at least 15 mm, at least 20 mm, at least 25 mm, at least 30 mm, at least 40 mm, at least 50 mm, at least 60 mm, at least 70 mm, at least 80 mm, at least 90 mm, or at least 100 mm. In some embodiments, the rope has a cross-sectional diameter of at most 200 mm, at most 175 mm, at most 150 mm, at most 125 mm, at most 100 mm, at most 90 mm, at most 80 mm, at most 70 mm, at most 60 mm, at most 50 mm, at most 40 mm, at most 30 mm, at most 25 mm, at most 20 mm, at most 15 mm, or at most 10 mm.

In some embodiments, the rope is a twisted, stranded, or wire-lay rope. In other embodiments, the rope is a braided rope.

Methods for Producing Rope

Embodiments described herein include methods for producing a rope comprising bundles of filaments, wherein each bundle comprises at least 70% by volume of LCP filaments, and wherein at least one bundle comprises LCP filaments of at least 10 dpf in size.

In the manufacture of the rope of the present application, well-known techniques for making ropes can be used. With reference to the exemplary embodiment of FIG. 1, fibers 16 and/or 18 are twisted (or alternatively braided) together to form yarn 14. Plural yarns 4 are braided (or alternatively twisted) to form strand 12. Finally, plural strands 2 are braided (or alternatively twisted) to form rope 10.

The number of fibers 6l and/or 18 twisted or braided together to form yarn 4 l is not particularly limited. Similarly, the number of yarns 14 twisted or braided together to form strand 12 is not particularly limited; in certain embodiments, the number of yarns 14 may range from 6 to 14, or from 8 to 12 Similarly, the number of strands 12 twisted or braided together to form rope 10 is not particularly limited; in certain embodiments, the number of strandsb 12 may range from b 6 to 14, or from 8 to 12.

Braiding equipment is commercially available and units of differing capabilities may be obtained. Suitable braiding equipment may include commercially-available braiders from Steeger USA (Inman, S.C. USA), Herzog GmbH (Oldenburg, Germany), and other manufacturers, that are designed for the braiding of fine-denier filaments and fibers.

However, the equipment available for preparing the rope of the present application is not limited to any specific manufacturers.

Methods for Pulling or Lifting

Embodiments described herein include methods for pulling or lifting an object using the above-mentioned rope. In particular, such methods comprise applying tension to such a rope connected to the object, wherein the rope is arranged over a sheave or a non-rotating guide surface, and wherein a ratio of a diameter of the sheave or an effective diameter of the non-rotating guide surface, D, to a diameter of the rope, d, is at least 20:1. In other embodiments, the ratio D:d is at least 25:1, or at least 30:1.

As described in the Background section above, ropes can be damaged in CBOS applications due to fiber-to-fiber abrasion. Such damage traditionally has been a limiting factor in using large-diameter ropes made from LCP fibers. Without being bound by theory, it is thought that the use of relatively larger LCP filaments (10 dpf or larger) in embodiments of the present application reduces the damage caused by fiber-to-fiber abrasion.

However, the use of relatively larger LCP filaments in embodiments of the present application is thought to generate additional heat by polymer hysteresis in CBOS applications, if the bending radius of the bending cycle is too small. Accordingly, when the rope according to embodiments of the present application is used in CBOS applications, the ratio of a diameter of the sheave or an effective diameter of the non-rotating guide surface, D, to a diameter of the rope, d, should be at least 20:1, preferably at least 25:1, and even more preferably at least 30:1. Using such ratios of D:d reduces the likelihood of excessive heat generation in the rope due to polymer hysteresis.

Embodiments

Embodiment [1] of the present disclosure relates to a rope comprising bundles of filaments, wherein each bundle comprises at least 70% by volume of liquid crystal polymer filaments, and wherein at least one bundle comprises liquid crystal polymer filaments of at least 10 denier per filament in size.

Embodiment [2] of the present disclosure relates to the rope of Embodiment [1] wherein the liquid crystal polymer filaments comprise thermotropic liquid crystal polymer filaments.

Embodiment [3] of the present disclosure relates to the rope of Embodiment [2], wherein the thermotropic liquid crystal polymer filaments comprise an aromatic polyester formed by the polycondensation of 4-hydroxybenzoic acid and 6-hydroxynaphthalene-2-carboxylic acid.

Embodiment [4] of the present disclosure relates to the rope of Embodiment [1], wherein the liquid crystal polymer filaments comprise lyotropic liquid crystal polymer filaments.

Embodiment [5] of the present disclosure relates to the rope of Embodiment [4], wherein the lyotropic liquid crystal polymer filaments comprise an aramid or a copolymer aramid.

Embodiment [6] of the present disclosure relates to the rope of at least one of Embodiments [1]-[5], wherein the rope has a cross-sectional diameter of at least 6 mm.

Embodiment [7] of the present disclosure relates to the rope of at least one of Embodiments [1]-[6], wherein the rope has a cross-sectional diameter of 6 mm to 200 mm.

Embodiment [8] of the present disclosure relates to the rope of at least one of Embodiments [1]-[7], wherein each bundle comprises 15 to 5000 of the liquid crystal polymer filaments.

Embodiment [9] of the present disclosure relates to the rope of at least one of Embodiments [1]-[8], wherein the rope is a twisted, stranded, or wire-lay rope.

Embodiment [10] of the present disclosure relates to the rope of at least one of Embodiments [1]-[8], wherein the rope is a braided rope.

Embodiment [11] of the present disclosure relates to the rope of at least one of Embodiments [1]-[10], wherein each bundle comprises at least 80% by volume of liquid crystal polymer filaments.

Embodiment [12] of the present disclosure relates to the rope of at least one of Embodiments [1]-[11], wherein each bundle comprises at least 90% by volume of liquid crystal polymer filaments.

Embodiment [13] of the present disclosure relates to the rope of at least one of Embodiments [1]-[12], wherein each bundle comprises at least 95% by volume of liquid crystal polymer filaments.

Embodiment [14] of the present disclosure relates to the rope of at least one of Embodiments [1]-[13], wherein each bundle comprises at least 99% by volume of liquid crystal polymer filaments.

Embodiment [15] of the present disclosure relates to the rope of at least one of Embodiments [1]-[14], wherein each bundle consists of liquid crystal polymer filaments.

Embodiment [16] of the present disclosure relates to the rope of at least one of Embodiments [1]-[15], wherein at least one bundle comprises liquid crystal polymer filaments of 10 to 100 denier per filament in size.

Embodiment [17] of the present disclosure relates to the rope of at least one of Embodiments [1]-[16], wherein at least one bundle comprises liquid crystal polymer filaments of 20 to 100 denier per filament in size.

Embodiment [18] of the present disclosure relates to the rope of at least one of Embodiments [1]-[17], wherein at least one bundle comprises liquid crystal polymer filaments of 28 to 100 denier per filament in size.

Embodiment [19] of the present disclosure relates to the rope of at least one of Embodiments [1]-[18], wherein at least one bundle comprises liquid crystal polymer filaments of 40 to 100 denier per filament in size.

Embodiment [20] of the present disclosure relates to the rope of at least one of Embodiments [1]-[19], wherein each bundle comprises liquid crystal polymer filaments of 10 to 100 denier per filament in size.

Embodiment [21] of the present disclosure relates to the rope of at least one of Embodiments [1]-[20], wherein each bundle comprises liquid crystal polymer filaments of 20 to 100 denier per filament in size.

Embodiment [22] of the present disclosure relates to the rope of at least one of Embodiments [1]-[21], wherein each bundle comprises liquid crystal polymer filaments of 28 to 100 denier per filament in size.

Embodiment [23] of the present disclosure relates to the rope of at least one of Embodiments [1]-[22], wherein each bundle comprises liquid crystal polymer filaments of 40 to 100 denier per filament in size.

Embodiment [24] of the present disclosure relates to a method of pulling or lifting an object, comprising applying tension to a rope connected to the object, wherein:

the rope is the rope of at least one of Embodiments [1]-[23], the rope is arranged over a sheave or a non-rotating guide surface, and a ratio of a diameter of the sheave or an effective diameter of the non-rotating guide surface, D, to a diameter of the rope, d, is at least 20:1.

Embodiment [25] of the present disclosure relates to the method of Embodiment [24], wherein the ratio of the diameter of the sheave or the effective diameter of the non-rotating guide surface, D, to the diameter of the rope, d, is at least 25:1.

Embodiment [26] of the present disclosure relates to the method of Embodiment [24], wherein the ratio of the diameter of the sheave or the effective diameter of the non-rotating guide surface, D, to the diameter of the rope, d, is at least 30:1.

EXAMPLES

Figure 2:
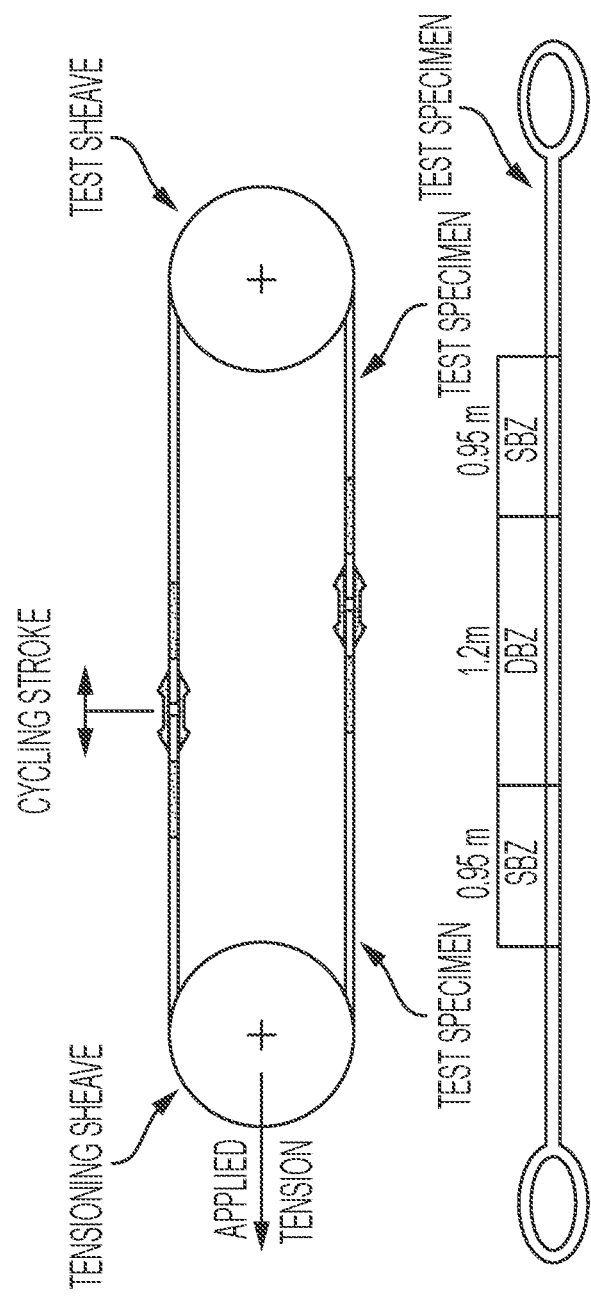
FIG. 2 is a schematic illustration of an apparatus for testing CBOS performance of a rope.

FIG. 2 is a schematic illustration of an apparatus to test cyclic bend-over-sheave (CBOS) performance of a rope. The apparatus has a test sheave and a tensioning sheave. Tension is applied to the tensioning sheave. Two test specimens are arranged on the sheaves, and their free ends are joined together with a coupler. Alternatively, a dummy rope can be arranged over the tensioning sheave, and a single test specimen can be arranged over the test sheave. The test specimen that is arranged over the test sheave is illustrated in the lower portion of the figure. The test specimen includes a rope portion and an eye splice at each end of the rope portion. The rope portion includes a double bend zone (DBZ) and two single bend zones (SBZ) located on either side of the DBZ. FIG. 2 shows an exemplary embodiment in which the DBZ is 1.2 m in length, and each SBZ is 0.95 m in length. However, other lengths of the DBZ and SBZ can be used, depending on factors such as the diameter of the test sheave.

Figure 3:
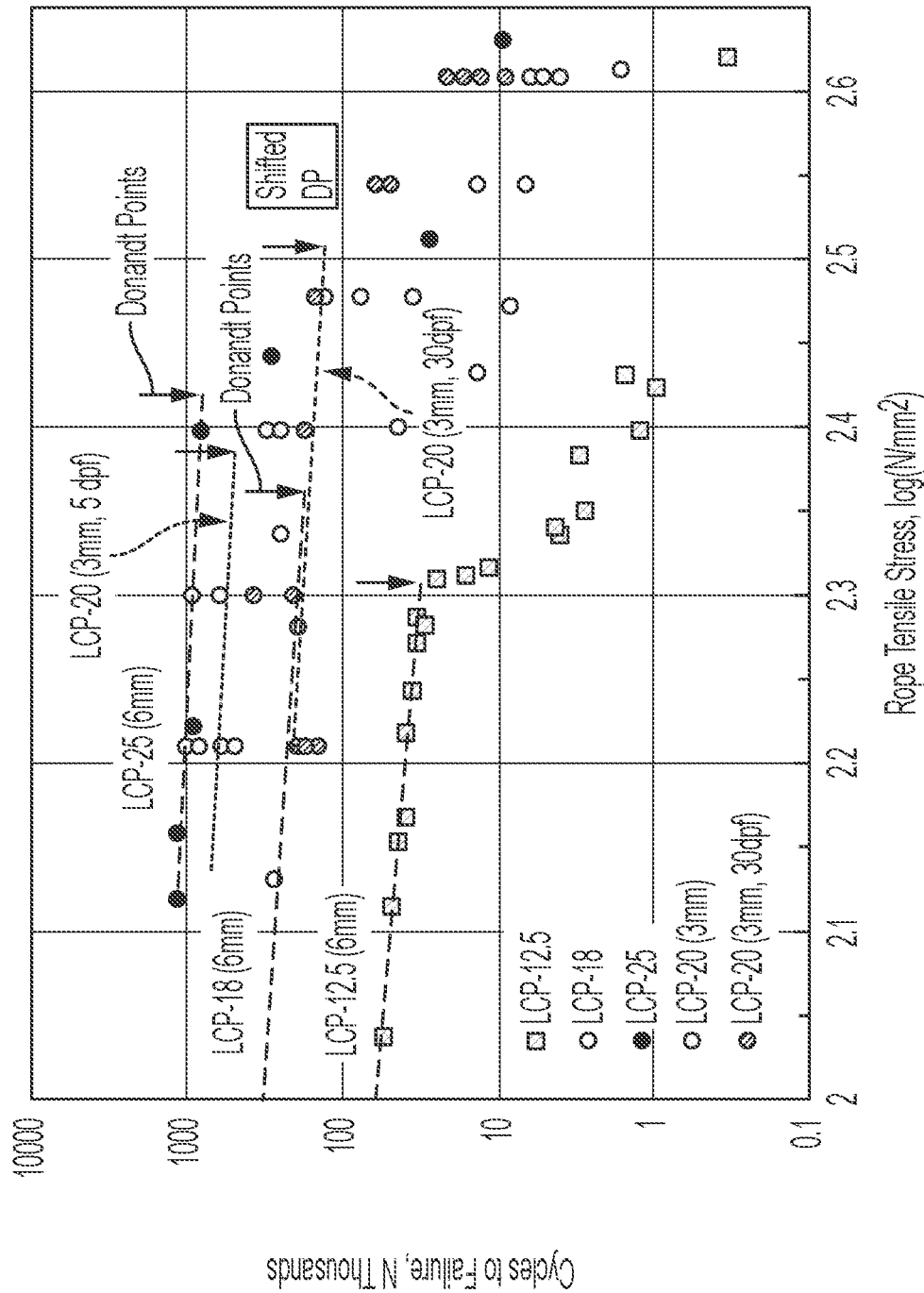
FIG. 3 is a graph showing experimental data of several different ropes tested for CBOS performance.

FIG. 3 is a graph of CBOS experimental data obtained using an apparatus similar to that shown in FIG. 2. The graph shows CBOS fatigue lifetime (in cycles to failure, N) vs. applied stress (N/mm$^2$) for several LCP rope designs and sheave sizes.

Three sets of CBOS data were generated by Heinze [Thorsten Heinze, Dr.-Ing. Dissertation, Techni Univ Chemnitz, November 2013] on 6 mm diameter 12-strand braided Vectran LCP ropes, using Vectran HT/1500d/300f/T97C (5 dpf). These are labeled in FIG. 3 as LCP-25 (6 mm), LCP-18 (6 mm), and LCP-12.5 (6 mm), tested at D:d ratios of 25, 18, and 12.5, respectively, where D was the diameter of the sheave and d was the diameter of the rope.

As is typically seen in CBOS experiments, the initial portion of each curve was linear (on a log-log plot), up until the Donandt point was reached (indicated by vertical arrows in FIG. 3). The Donandt point indicates the stress level where damage modes become more severe and/or other damage mechanisms begin to operate, resulting in more rapid damage progression and fewer cycles to failure.

Experimental data from two additional examples are shown in FIG. 3. These two additional examples illustrate the effect of varying filament denier (denier per filament or dpf) on CBOS fatigue life. The two additional examples used similar experimental conditions to the above three examples, but with a few changes. The changes included (a) a different finish on the ropes (T190M), (b) a smaller rope size (3 mm diameter), and (c) different D:d ratios.

The two additional examples were a standard 5 dpf LCP rope (HT/1500d/300f/T190M) as control, and an experimental 30 dpf LCP rope (HT/1670T/50f/T190M). The data from these examples are shown in FIG. 3 as LCP-20 (3 mm, 5 dpf) and LCP-20 (3 mm, 30 dpf), respectively.

As shown in FIG. 3, the control LCP-20 (3 mm, 5 dpf) performed similarly to the 6 mm ropes. The slope of the linear portion of the test data was similar, with these D:d=20 results falling between the D:d=18 and the D:d=25 data. Also the apparent Donandt point was located in the general area expected from interpolation between the D:d=25 and D:d=18 points. Although more data points in the high N area of the study might have improved the correlation, it seems that the control LCP-20 (3 mm, 5 dpf) data fall within the range expected from the 6 mm rope data.

In contrast, the data from the experimental fiber LCP-20 (3 mm, 30 dpf) showed two distinct differences. First, the linear portion of the curve (estimated by the dashed line) was shifted downward, to slightly below the D:d=18 line. This shows that there was a reduction in the CBOS fatigue resistance compared with the control, in the region below the expected Donandt point. This result was perhaps not unexpected, because bending stresses likely would be higher due to the larger filament diameter. However, the surprising and unexpected positive result versus the control was the apparent shift of the Donandt point to much higher stresses for the 30 dpf ropes. This could have been the result of the larger filament size, e.g., extending the time when abrasion could cause sufficient cross section reduction to induce more rapid bending/buckling damage mechanisms.

Other tests were performed at a D:d ratio of 8:1. However, no significant difference was observed between the 5 dpf control ropes and 30 dpf test ropes at this D:d ratio (data not shown). This was not surprising, because this was a severe test condition and would be especially severe for high dpf fibers because of the much lower D:d ratio. Many of the resulting lifetimes were less than 1000 cycles and not statistically relevant. However, these data did suggest that the effect of increasing the Donandt stress was not observed for low D:d ratios.

The above description is presented to enable a person skilled in the art to make and use the invention, and is provided in the context of a particular application and its requirements. Various modifications to the embodiments disclosed herein will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the disclosure may not show every benefit of the invention, considered broadly.

REFERENCE CHARACTERS

10 rope in FIG. 1
12 strand in FIG. 1
14 yarn in FIG. 1
16 fibers in FIG. 1, composed of filaments
18 other fibers in FIG. 1, composed of filaments

What is claimed is:
1. A rope comprising bundles of filaments, wherein each bundle comprises at least 70% by volume of liquid crystal polymer filaments, and wherein at least one bundle comprises liquid crystal polymer filaments of at least 10 denier per filament in size.

2. The rope of claim 1, wherein the liquid crystal polymer filaments comprise thermotropic liquid crystal polymer filaments.

3. The rope of claim 2, wherein the thermotropic liquid crystal polymer filaments comprise an aromatic polyester formed by the polycondensation of 4-hydroxybenzoic acid and 6-hydroxynaphthalene-2-carboxylic acid.

4. The rope of claim 1, wherein the liquid crystal polymer filaments comprise lyotropic liquid crystal polymer filaments.

5. The rope of claim 4, wherein the lyotropic liquid crystal polymer filaments comprise an aramid or a copolymer aramid.

6. The rope of claim 1, wherein the rope has a cross-sectional diameter of at least 6 mm.

7. The rope of claim 1, wherein the rope has a cross-sectional diameter of 6 mm to 200 mm.

8. The rope of claim 1, wherein each bundle comprises 15 to 5000 of the liquid crystal polymer filaments.

9. The rope of claim 1, wherein the rope is a twisted, stranded, or wire-lay rope.

10. The rope of claim 1, wherein the rope is a braided rope.

11. The rope of claim 1, wherein each bundle comprises at least 80% by volume of liquid crystal polymer filaments.

12. The rope of claim 1, wherein each bundle comprises at least 90% by volume of liquid crystal polymer filaments.

13. The rope of claim 1, wherein each bundle comprises at least 95% by volume of liquid crystal polymer filaments.

14. The rope of claim 1, wherein each bundle comprises at least 99% by volume of liquid crystal polymer filaments.

15. The rope of claim 1, wherein each bundle consists of liquid crystal polymer filaments.

16. The rope of claim 1, wherein at least one bundle comprises liquid crystal polymer filaments of 10 to 100 denier per filament in size.

17. The rope of claim 1, wherein each bundle comprises liquid crystal polymer filaments of 10 to 100 denier per filament in size.

18. A method of pulling or lifting an object, comprising applying tension to a rope connected to the object, wherein:
the rope is the rope of claim 1,
the rope is arranged over a sheave or a non-rotating guide surface, and
a ratio of a diameter of the sheave or an effective diameter of the non-rotating guide surface, D, to a diameter of the rope, d, is at least 20:1.

19. The method of claim 18, wherein the ratio of the diameter of the sheave or the effective diameter of the non-rotating guide surface, D, to the diameter of the rope, d, is at least 25:1.

20. The method of claim 18, wherein the ratio of the diameter of the sheave or the effective diameter of the non-rotating guide surface, D, to the diameter of the rope, d, is at least 30:1.

* * * * *